United States Patent
Nicolas et al.

(10) Patent No.: US 6,415,015 B2
(45) Date of Patent: Jul. 2, 2002

(54) METHOD AND SYSTEM OF COMPENSATION OF THICKNESS OF AN ORGAN

(75) Inventors: Francois Nicolas, Palaiseau; Jean Lienard, Clamart; Serge Muller, Guyancourt; Elisabeth Soubelet, Meudon; Andreas Rick, Plaisir, all of (FR)

(73) Assignee: GE Medical Systems SA (FR)

( * ) Notice: Subject to any disclaimer, the term of this patent is extended or adjusted under 35 U.S.C. 154(b) by 11 days.

(21) Appl. No.: 09/745,886

(22) Filed: Dec. 21, 2000

(30) Foreign Application Priority Data

Dec. 28, 1999 (FR) .............................. 99 16586

(51) Int. Cl.$^7$ .............................................. G01N 23/04
(52) U.S. Cl. .......................................... 378/62; 378/98.7
(58) Field of Search ........................... 378/4, 62, 98.7, 378/98.12

(56) References Cited

FOREIGN PATENT DOCUMENTS

| EP | 0352016 | 1/1990 | | |
|----|---------|--------|---|---|
| EP | 0732669 | 9/1996 | | |
| EP | 1113392 A1 | * 4/2001 | ............. | G06T/5/40 |

* cited by examiner

*Primary Examiner*—David V. Bruce
(74) *Attorney, Agent, or Firm*—Jay L. Chaskin

(57) ABSTRACT

Method and system for compensating for the thickness of an organ in a radiology instrument, in which an image of the radiological thicknesses of the organ through which the X-ray beam has passed is calculated on the basis of a digitized image, the thickness image is filtered using a low-pass filter in order to obtain a low-frequency image, the low-frequency image is subtracted from the radiological thickness image in order to obtain a contrast image, the low-frequency image is processed using a pre-recorded table taking into account a contract $\chi$ selected by a user in order to obtain an image with reduced dynamic range, and the image with reduced dynamic range is added to the contrast image in order to obtain a compensated thickness image, the pixels having a level below or above a predetermined threshold being returned at least to the value of the threshold, while preserving the differences and real ratios between the anatomical structures.

18 Claims, 3 Drawing Sheets

METHOD AND SYSTEM OF COMPENSATION OF THICKNESS OF AN ORGAN

BACKGROUND OF THE INVENTION

The present invention concerns the field of radiological imaging to visualize an organ or part of an organ, generally of the human body.

Radiography is conventionally carried out with sensitive films exposed by X-rays after they cross the organs to be studied. Radiologists have been trained in the interpretation of such images. The new imaging technologies-solid state detector and digital acquisition system—must be adapted to common practices and must provide an equivalent perception of the pertinent information that radiologists are accustomed to examining. In particular, one of the requirements that digital systems must satisfy consists of reducing the extent of the gray level dynamics in order to simulate a conventional film as faithfully as possible. For this purpose, the digital image is displayed on a screen that the radiologist adjusts interactively in order to identify all the clinical signs by perceiving the relations between the different image components. But the precise perception of density information by means of the image displayed on the screen is limited by the dynamics of the screen. Now, one must pass automatically from the high contrast of the original image, for example, in the order of 30 to 50, to the low contrast offered by a video screen.

Physicians commonly apply configuration techniques to patients with a view to limiting the dynamics of acquired images, for example, by compression of thick regions and/or by addition of absorbent substances in order to compensate for thin zones. In the case of X-ray mammography, the breast is compressed to the smallest and most constant possible thickness. In the field of cardiology, contour filters are used to avoid problems associated with weakly absorbent zones of the chest, such as the lungs. These filters consist of plates of shape complementing that of the heart, made of materials of given X-ray absorption coefficients.

However, these techniques prove insufficient for digital image acquisition and processing and cumbersome to use, if not uncomfortable for the patient.

The present invention is intended to remedy the above-mentioned problems.

BRIEF SUMMARY OF THE INVENTION

The embodiments of the present invention compensate for variations of thickness, in particular at the limit between high-density regions and low-density regions of the organ X-rayed, in an adaptive manner, depending on characteristics of the image visualized, chosen by a user.

The present invention is intended to offer an image on which tissues presenting absorptions different from one another are naturally and exploitably represented.

The method of compensation of thickness of an organ is designed for an X-ray apparatus of the type comprising an X-ray source and a means of detection of the X-ray beam after it has crossed the organ, the means of detection being capable of converting the X-ray beam into a digital electronic signal. From a digitized image, an image of the radiological thicknesses of organs crossed by the X-ray beam is calculated, the image of radiological thicknesses is filtered by a low-pass filter in order to obtain a low-frequency image, the low-frequency image is subtracted from the image of the radiological thicknesses in order to obtain a contrast image, the low-frequency image is processed by a prerecorded table taking into account a contrast $\chi$ chosen by a user in order to obtain an image with reduced dynamics, and the image with reduced dynamics and the contrast image are added to obtain a compensated thickness image. The pixels of level lower or higher than a predetermined threshold are brought back at least to the value of the threshold, while preserving the differences and the real relations between the anatomical structures.

The thickness of an organ measured by X-rays is called radiological thickness, in other words, taking into account the absorption of the materials crossed. For example, 1 cm of bone has the same radiological thickness as 10 cm of water.

The thickness image can be obtained by means of Lambert's law: $I=Ioe^{-\mu t}$ with I the number of photons received at a given point of the means of detection, Io the number of photons which would be received at a given point of the means of detection, if the organ was not present in the field of view, $\mu$ the coefficient of linear attenuation of the X-rays by the material crossed, and t the thickness of material crossed, from which one deduces:

In Io−ln I=$\mu t$, the product $\mu t$ corresponding to the gray level for a pixel of a radiological thickness image.

Calculation of the image with reduced dynamics advantageously takes into account a range of gray levels of width and center indicated by a user.

In an embodiment of the invention, the low-frequency image processing for obtaining the image with reduced dynamics is carried out as a function of the width and center of the passband.

In an embodiment of the invention, the low-frequency image processing for obtaining the image with reduced dynamics is carried out by means of a digital table or an analytical law.

In an embodiment of the invention, the low-frequency image processing follows a monotone law.

In an embodiment of the invention, the low-frequency image processing follows a linear law of slope $\alpha$.

The slope $\alpha$ advantageously evolves in a manner inversely proportional to the contrast $\chi$.

In an embodiment of the invention, the low-frequency image is stored in a memory and, on a change of contrast, the low-frequency image is read in the memory and the necessary processings and calculations are carried out.

In another embodiment of the invention, on a change of contrast, the image of radiological thicknesses is filtered by a low-pass filter in order to obtain a low-frequency image and the necessary processings and calculations are carried out.

The present invention also concerns a system of compensation of thickness of an organ in an X-ray apparatus. The X-ray apparatus is of the type comprising an X-ray source and a means of detection of the X-ray beam after it has crossed the organ, the means of detection being capable of converting the X-ray beam into a digital electronic signal. The system includes a means of calculating, from a digitized image, an image of the radiological thicknesses of organs crossed by the X-ray beam, a low-pass filter for obtaining radiological thicknesses from the image, a low-frequency image, a means for subtracting the low-frequency image from the radiological thicknesses in order to obtain a contrast image, a means for processing the low-frequency image according to a prerecorded table taking into account a contrast $\chi$ chosen by a user in order to obtain an image with reduced dynamics and a means for adding the image with reduced dynamics and the contrast image in order to obtain a compensated thickness image, the pixels of level lower or higher than a predetermined threshold having been brought back at least to the value of the threshold, while preserving the differences and the real relations between the anatomical structures.

In an embodiment of the invention, the low-pass filter is calculated to eliminate the pixels corresponding to an organ loaded with contrast medium in the compensation image and thus maintain them in the compensated image.

Thus, the invention offers an image processing supplying an image equivalent to that which would be obtained by using an absorbent liquid on the edges of the organ over a part of their height and makes it possible to simulate a physical phenomenon, which provides a better understanding of the optimal adjustment of the parameters that has to be made. This image processing confers a natural and pleasing appearance to the different tissues of the organ studied. Each of those tissues is seen at the same time and on the same image with, on the one hand, a natural appearance and, on the other, a precision and quality enabling the user to derive important information from it, as if the user were interested only in one particular tissue. In the field of mammography, the glandular zones and the adipose zones are observed simultaneously with the possibility of deriving information from the same image on both of the zones.

The method is adaptable to existing X-ray machines and can be applied to the radiography of any organ at all.

Whatever the extent and centering of the range of gray levels chosen by the user for visualization, a choice made to favor certain types of organs or tissues in the organ studied, the image is processed in a manner adapted to that choice.

BRIEF DESCRIPTION OF THE INVENTION

The present invention will be better understood by studying the detailed description of an embodiment taken by way of non-limitative example and illustrated by the attached drawings, in which.

DETAILED DESCRIPTION OF THE INVENTION

Figure 1:
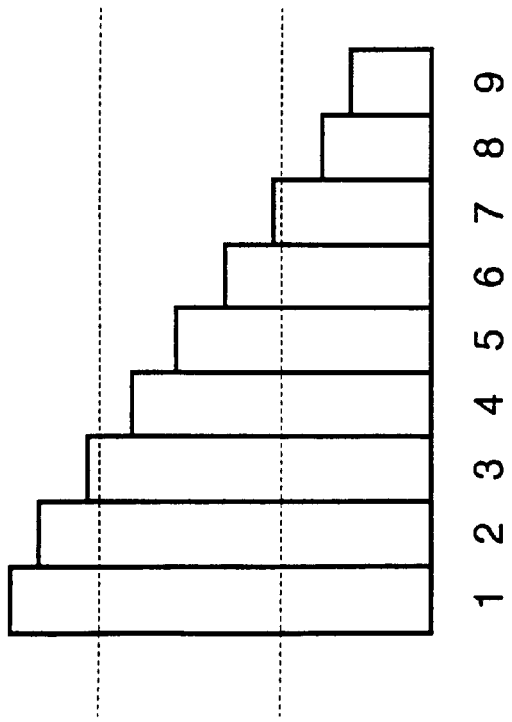
FIG. 1 is a schematic representation of an organ composed of zones of different thicknesses.

As can be seen in FIG. 1, the dynamics of an image of an organ can exceed the dynamics of thicknesses representable by the display screen and represented by the two horizontal dotted lines. Thus, blocks 1 to 3 are at too high a gray level, while blocks 8 and 9 are at too low a level. The physical phenomena or parts of the organ found in such zones are therefore not satisfactorily displayed. By maintaining the same screen dynamics, it is conceivable, first of all, to display blocks 1 to 4, then, secondly and after modification of the width and center of the range of gray levels of the screen, blocks 5 to 9. By taking the example of the mammogram, a first image would be obtained, on which only the contour of the breast would be seen, without viewing its internal tissues. The second image would show solely its internal tissues, adipose zone or glandular zone, without its contour being perceived, which is hardly practical and complicates the work of the radiologist.

Figure 2:
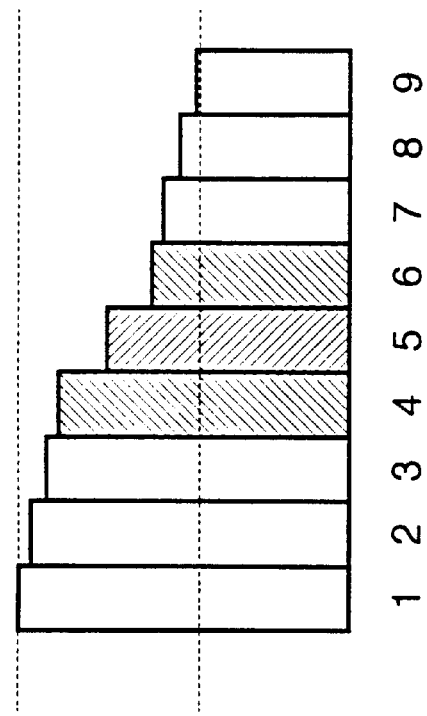
FIG. 2 is a schematic representation of an organ composed of zones of different compensated thicknesses.

In an embodiment of the invention, the digital compensation of the crude image is based on the following principle: the image compensation process simulates the addition or removal of an appropriate quantity of material in boundary regions, for example, between zones of high absorption and zones of low absorption of X-rays, so that the dynamics are reduced, while taking into account the constraint of preservation of the difference and real relations between the anatomical structures. Thus, it can be seen that in FIG. 2, blocks 1 to 9 are contained within the limits of the screen dynamics. Blocks 1 to 3, instead of being white-saturated, are brought back just below the upper limit of saturation and preserve their original relation, namely: block 1 lighter than the block 2 lighter than the block 3, etc. The same is true for blocks 8 and 9 which, instead of being black-saturated, are situated in proximity to the lower limit of the dynamics, so as to be visible and, while preserving their original difference, block 7 lighter than the block 8 lighter than the block 9.

Figure 3:
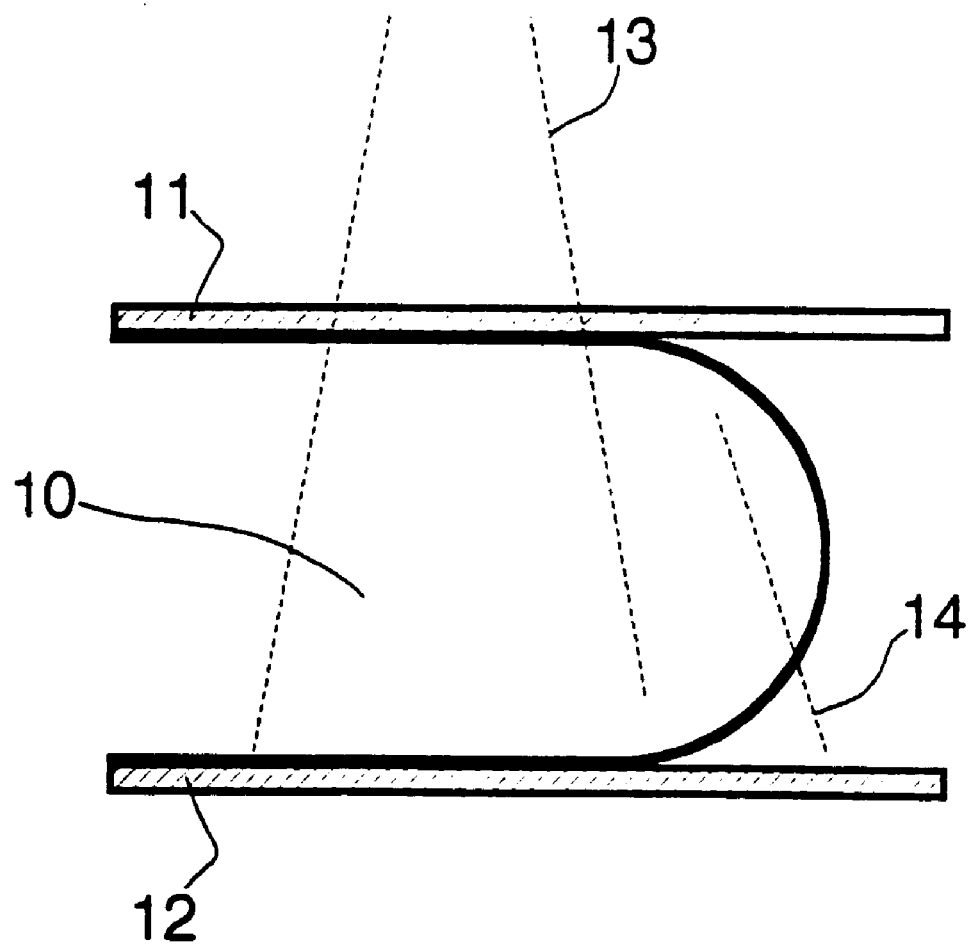
FIG. 3 is a schematic view of a breast compressed for a mamnrmogram.

In FIG. 3, a breast 10 can be seen, compressed between a plate 11 and a table 12 which form part of an X-ray apparatus, not represented. The breast is subjected to an X-ray beam 13 emitted by a source not represented. A digital detector, not represented, is placed on the path of the X-ray beam 13 after crossing the breast 10. It can be observed that some X-rays, referenced 14, cross only a part of the thickness of the breast owing to its rounded shape at the tip. Consequently, these X-rays are less attenuated than those having crossed the total thickness of the breast, which risks leading to a saturation of the image portion corresponding to rays 14 and to the display of a black screen portion. In fact, a white portion corresponds to a thick zone and a black portion corresponds to a thin zone by convention.

Figure 4:
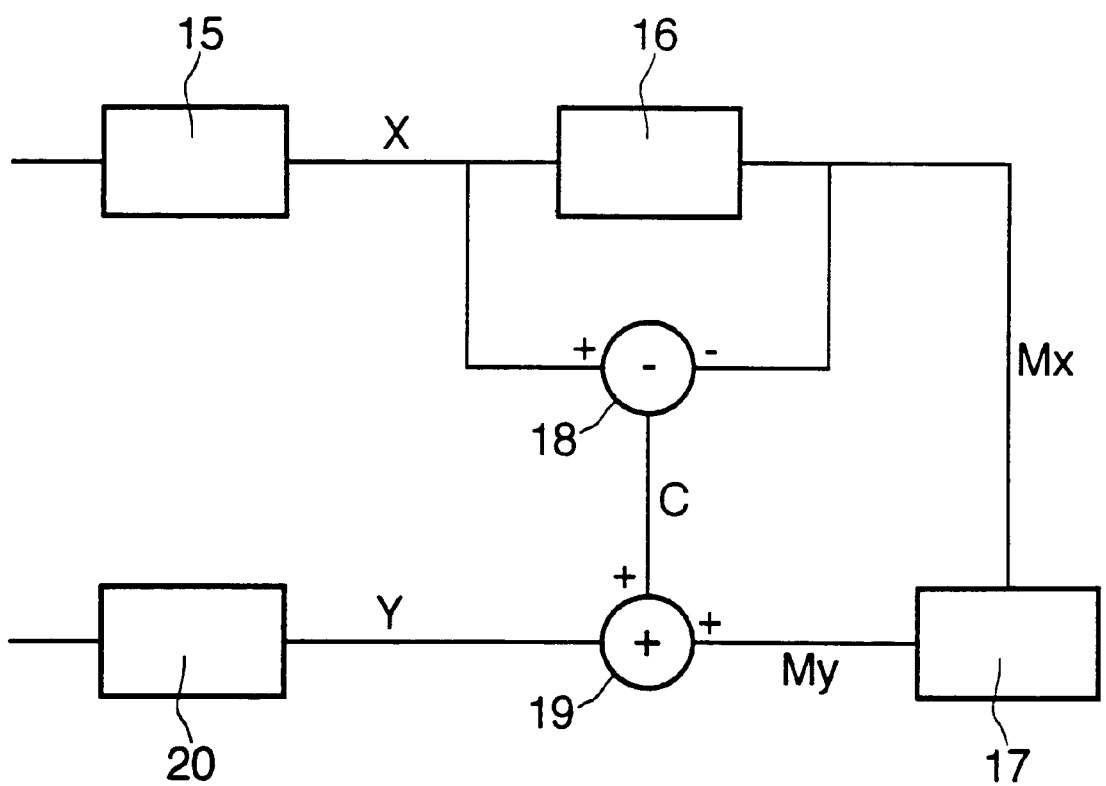
FIG. 4 is a schematic view of a system according to an embodiment of the invention.

As can be seen in FIG. 4, an application of the system according to the invention consists of a mathematical processing module 15 capable of applying to an image received in input from a digital detector, not represented, a logarithm function. In fact, the level of each pixel of the input image is representative of the intensity of the X-radiation received. The logarithm function makes it possible to pass from radiological intensities to thicknesses.

For a given point of the image, the number I of photons received by a given point of the means of detection is determined by the following equation: $I=Imax \times e^{-\mu t}$, being the thickness of the organ crossed by the X-rays and $\mu$ being the density of the organ crossed. Applying the logarithm function leads to $\mu \times t = \ln(Imax) - \ln(I)$, Imax being known and corresponding to the number of photons which would be received on a given point of the means of detection if the organ was not present in the field of view. The product $\mu \times t$ is therefore known, being called densitometric or radiological thickness.

In practice, it may be preferred to apply a slightly different equation, based on quantity G, which is the gray level of a given point of the means of detection: $\mu t = K \times \ln(Gmax+1) = K \times \ln(G+1)$. Gain K is applied to protect the variation of gray level higher than 1% of maximum intensity, such as $K \times \ln(Gmax+1) - K \times \ln(0.99\ Gmax+1) \leq 1$. The application of that logarithm function makes it possible to obtain a histogram of thickness.

The processing system further includes a filter 16 of low-pass type for receiving the pixels X of an input thickness image and supplying on output pixels filtered or of input mask $M_x$, an operator 17 placed downstream from the filter 16 and performing a function noted Φ, and a summator-subtractor 18 receiving the pixels of the input thickness image on the output of the operator 15 and also receiving the pixels filtered on the output of the filter 16 in order to subtract the filtered pixels from the pixels of the input thickness image and to supply a contrast image of pixels $C=X-M_x$. The filter 16 may preserve the structures of size greater than a nominal value, being associable with the size of structures of interest present in the organ, for example, equal to 2 cm.

The processing system includes a summator-adder 19 placed downstream from the operator 17 and from the summator-subtractor 18 receiving the contrast pixels C and the pixels $M_y$. The output pixels of the operator 17 are noted $M_y$ with $M_y=\Phi(M_x)$. The summator-adder 19 performs the operation of addition of the contrast pixels C and output pixels $M_y$ of the operator 17 and supplies on output the output pixels noted Y, with $Y=C+M_y$ or even $Y=X-M_x+<(M_x)$.

An image transformation is thus made. The function ϕ of the operator 17 is a monotone function with adjustable slope in order to simulate the addition or removal of an appropriate quantity of material in different regions, so that the dynamics of the image will be reduced, while preserving the real relations between the anatomical structures. The preservation of the relations is associated with the monotony of the function Φ. Preferably, Φ is a linear function of slope α, the slope α being adapted to the contrast chosen by the user. If α=1, then the dynamics are preserved and $M_y=M_x$. The operator 17 can contain a prerecorded table which takes into account the contrast χ of the image having to be displayed, as chosen by a user. As a variant, the operator 17 can follow an analytical law.

The contrast χ of the image having to be displayed may be determined by a user by choosing a range of gray levels $W_w$ of the image and a center of the range of gray levels, for example, by keyboard command or by means of a mouse, not represented. The slope α established by a table or by an analytical law evolves in a manner inversely proportional to the contrast χ and, more precisely, to the width $W_w$ of the range of gray levels. In other words, when the user changes the width $W_w$ of the range of gray levels from $W_w$ to $W'_w$, the slope evolves from α to α', with $W_w/W'_w=\alpha'/\alpha$. The general appearance of the image is thus preserved and so is that of the tissues observed, whatever their type, for example, pectoral, glandular, adipose, subcutaneous or cutaneous in mammography.

On such change of contrast, the different stages can be repeated from the thickness image stored in a memory, not represented, of the system which is directly accessed or by means of a data bus.

The filtered image can also be stored in a memory and repeat only the stages subsequent to filtering, which reduces the times of calculation, but slightly complicates the management of memory access.

If a particular pixel $X_n$ is of gray level representative of a thickness greater than a pixel $X_m$ and less than a pixel $X_p$, the same relation will exist between the output pixels: $Y_m<Y_n<Y_p$. The dynamics of an image is thus reduced in a proportion which will depend on the dynamics of an input image sent by a digital detector and the dynamics of an output image, so that the display means are capable of making it available to a user. The different processings are carried out on so-called "thickness" images, that is, in which the value of each pixel is representative of the thickness of the tissues crossed by the X-rays.

The output pixels Y are sent to a display table 20 from to which a user can choose the contrast χ of the image visualized.

The processing method is available for visualizing on the same image tissues of very different radiological characteristics, by breaking free, at least in part, of the constraints of external luminosity associated with illumination of the site on which visualization takes place.

The image obtained according to disclosed embodiments presents no artifact and is of normal appearance. The method can be used in various fields of radiology, while being adapted to digital detection and processing, without changing the users' practices. An increase of contrast is prevented from being manifested by a reduction of dynamics of the image displayed, as commonly occurs. An increase of contrast is also prevented from being manifested by a saturation of certain zones of the image representing tissues that it is desirable to observe at the same time as other tissues represented by nonsaturated zones, as, for example, in mammography, the saturation of adipose zones becoming too dark if the contrast is increased on the glandular zones or, conversely, the saturation of the adipose zones becoming too dark if the contrast is increased on the glandular zones or, conversely, saturation of the glandular zones becoming too light, if the contrast on the adipose zones is increased. This is due to the fact that contrast is taken into account in image processing for display.

Various modifications in structure and/or steps and/or function may be made by one skilled in the art without departing from the scope of the invention.

What is claimed is:

1. A method of compensation of thickness of an object in a radiological imaging apparatus having radiation source and a means of detection of the radiation source after it has crossed the object, the means of detection being capable of converting the radiation source into a digital electronic signal, in which, from a digitized image, an image of the radiological thicknesses of the object crossed by the radiation source is calculated, the image of radiological thicknesses is filtered by a low-pass filter in order to obtain a low-frequency image, the low-frequency image of radiological thicknesses is subtracted in order to obtain a contrast image, the low-frequency image is processed by a prerecorded table or calculated in real time taking into account a contrast χ chosen by a user in order to obtain an image with reduced dynamics and the image with reduced dynamics and the contrast image are added in order to obtain a compensated thickness image, the pixels of level lower or higher than a predetermined threshold having been brought back at least to the value of the threshold, while preserving the differences and the real relations between the internal structures of the object.

2. The method according to claim 1, in which calculation of the image with reduced dynamics takes into account a range of gray levels of width and center indicated by a user.

3. The method according to claim 2, in which processing of the low-frequency image for obtaining the image with reduced dynamics is carried out in accordance with the width and center of the range of gray levels.

4. The method according to claim 1 in which processing of the low-frequency image for obtaining the image with reduced dynamics is carried out by means of a digital table or an analytical law.

5. The method according to claim 2 in which processing of the low-frequency image for obtaining the image with reduced dynamics is carried out by means of a digital table or an analytical law.

6. The method according to claim 3 in which processing of the low-frequency image for obtaining the image with reduced dynamics is carried out by means of a digital table or an analytical law.

7. The method according to claim 4, in which processing of the low-frequency image follows a monotone law.

8. The method according to claim 5, in which processing of the low-frequency image follows a monotone law.

9. The method according to claim 6, in which processing of the low-frequency image follows a monotone law.

10. The method according to claim 7, in which processing of the low-frequency law follows a linear law of slope $\alpha$.

11. The method according to claim 8, in which processing of the low-frequency law follows a linear law of slope $\alpha$.

12. The method according to claim 9, in which processing of the low-frequency law follows a linear law of slope $\alpha$.

13. The method according to claim 6, in which the slope $\alpha$ evolves in a manner inversely proportional to the contrast $\chi$.

14. The method according to claim 11, in which the slope $\alpha$ evolves in a manner inversely proportional to the contrast $\chi$.

15. The method according to claim 12, in which the slope $\alpha$ evolves in a manner inversely proportional to the contrast $\chi$.

16. The method according to claim 1 in which a low-frequency image is stored in a memory and, on a change of contrast, the low-frequency image is read in the memory and the necessary processings and calculations are carried out.

17. The method according to claim 1 in which, on a change of contrast, the parameters of the filter applied to the image of radiological thicknesses by a low-pass filter are adapted in order to obtain a low-frequency image and the necessary processings and calculations are carried out.

18. A system of compensation of thickness of an object in a radiological imaging apparatus, of the type comprising a radiation source and a means of detection of the radiation source after it has crossed the object, the means of detection being capable of converting the radiation source into a digital electronic signal, including a means for calculating, from a digitized image, an image of the radiological thicknesses of object crossed by the radiation source, low-pass filter for obtaining radiological thicknesses from the image, a low-frequency image, means for subtracting the low-frequency image from the radiological thicknesses in order to obtain a contrast image, means for processing the low-frequency image according to a prerecorded table taking into account a contrast $\chi$ chosen by a user in order to obtain an image with reduced dynamics and means for adding the image with reduced dynamics and the contrast image in order to obtain a compensated thickness image, the pixels of level lower or higher than a predetermined threshold having been brought back at least to the value of the threshold, while preserving the differences and the real relations between the features of the object.

* * * * *